Figure 1:
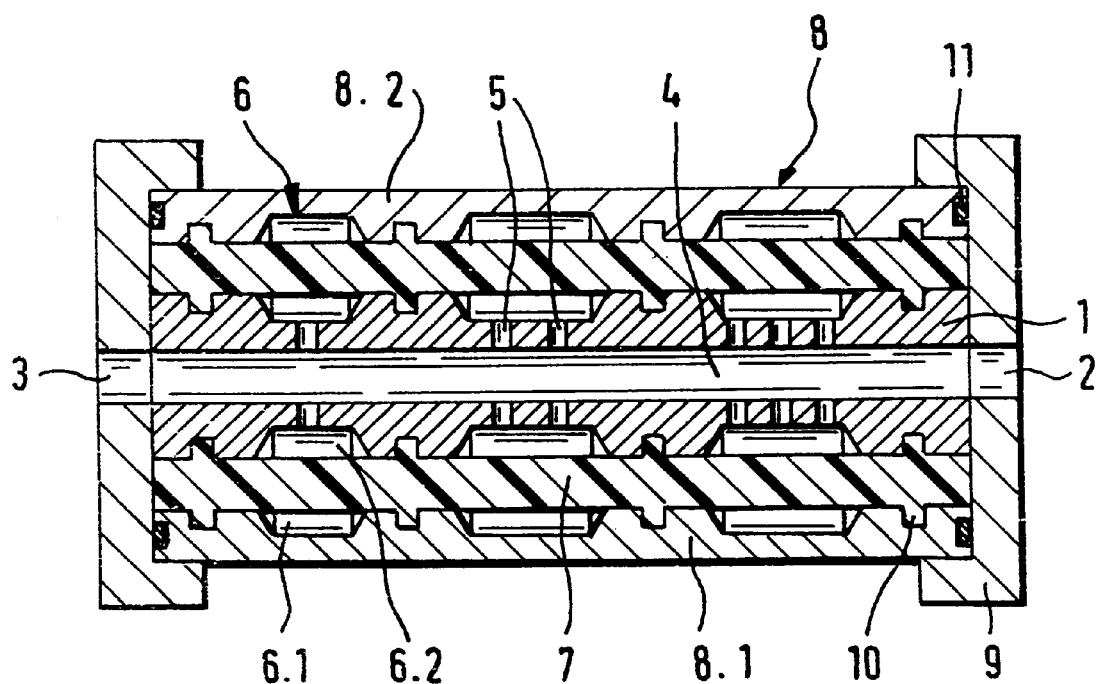

United States Patent [19]
Wolf et al.

[11] Patent Number: 6,109,304
[45] Date of Patent: Aug. 29, 2000

[54] PULSE DAMPER

[75] Inventors: Franz Josef Wolf, Bad Soden-Salmunster; Anton Wolf, Gelnhausen; Josef Hohmann, Steinau a.d. Str.; Udo Gartner, Steinau-Bellings, all of Germany

[73] Assignee: Woco Franz-Josef Wolf & Co., Bad-Soden-Salmunster, Germany

[21] Appl. No.: 09/176,756

[22] Filed: Oct. 22, 1998

[30]     Foreign Application Priority Data

Oct. 24, 1997  [DE]    Germany ........................... 197 47 158

[51] Int. Cl.[7] ...................................................... F16L 55/04
[52] U.S. Cl. .................. 138/30; 138/26; 220/721
[58] Field of Search .................. 138/30, 31, 26, 138/42; 220/721, 720, 723

[56]           References Cited

U.S. PATENT DOCUMENTS

| 3,625,242 | 12/1971 | Ostwald ..................................... 138/30 |
|---|---|---|
| 3,744,527 | 7/1973 | Mercier ..................................... 138/30 |
| 4,186,775 | 2/1980 | Muroi ....................................... 138/30 |
| 4,432,393 | 2/1984 | Mills ......................................... 138/30 |
| 4,628,964 | 12/1986 | Sugimura et al. ......................... 138/30 |
| 4,732,175 | 3/1988 | Pareja ....................................... 138/30 |
| 4,732,176 | 3/1988 | Sugimura ................................. 138/30 |
| 4,759,387 | 7/1988 | Arendt ...................................... 138/30 |
| 4,768,616 | 9/1988 | Richard et al. ....................... 138/30 X |
| 5,732,741 | 3/1998 | Shiery ...................................... 138/30 |
| 5,735,313 | 4/1998 | Jenski, Jr. et al. ........................ 138/30 |
| 5,860,452 | 1/1999 | Ellis ......................................... 138/30 |

*Primary Examiner*—Patrick Brinson
*Attorney, Agent, or Firm*—Lowe Hauptman Gopstein Gilman & Berner

[57]              ABSTRACT

The invention relates to a directly hydraulically damping broadband damper designed as a sequence of Helmholtz resonators with elastomer/gas springs to damp pressure pulses in pressurized liquids and in the audible range frequencies, in particular in hydraulic servo systems.

10 Claims, 1 Drawing Sheet

PULSE DAMPER

The invention relates to a damper to damp pressure pulses in pressurized liquids inside pressurized conduits. In particular the invention relates to a pulse damper damping pressure pulses in liquids passing through conduits and at frequencies in the audible range.

Such pressure pulses arise regularly in hydraulic conduits of the most diverse kinds, including control and servo systems subjected to high pressure changes. In particular as regards highly pressurized power-steering systems of many motor vehicles, such pressure pulses in the hydraulic operational fluid of the pressurized lines will be in the audible range, and accordingly the pulses are emitted as body vibrations by the pressurized pipes and are disagreeably audible, inside the vehicle, as whistles. Inevitably such pressure pulses are imparted by the pressure generators, mostly a gear pump, to the pressurized hydraulic fluid.

It is known, in order to damp the structurally emitted pressure pulses in hydraulic conduits of this kind, to insert substantial lengths of hydraulic conduit made of a rubber-fabric material between segments of the actual pressurized conduits for the purpose to at least reduce acoustic emission.

Alternatively, practical experiments are known to damp pulses in hydraulic pressurized lines using pressurized gas bubbles, in particular nitrogen bubbles, running in parallel.

Both known attempts to directly damp pulses in hydraulic conduits offer only unsatisfactory damping results. Furthermore they degrade the flow and transmission characteristics, of the pressurized lines they entail bulk, and even with insufficient service life, their continuous-operation reliability remains a critical factor.

It is the objective of the invention to create a pressure-pulse damper for pressurized fluids in hydraulic conduits, which furthermore can be used as a broadband damper in the range of 50 Hz to 20 kHz, which allows compactness and which because of rugged design is characterized by continuous operational reliability and long service life.

To that end the invention creates a damper damping pressure pulses in pressurized fluids passing through conduits, in particular to damp pulses of frequencies in the audible range and comprising the features stated in claim 1.

Accordingly the invention relates to a pulse damper to damp pressure pulses foremost occurring in load-changing, pressurized hydraulic conduits. In the invention, such a pulse damper as a whole is a rigid pipe segment allowing direct insertion into the hydraulic conduit. Appropriately, furthermore, such a damper is designed to be rotationally symmetric about a central axis. An axially continuous pipe stub of which the inside diameter at least is approximately the inside diameter of the adjoining hydraulic conduit is configured around said central axis which preferably but not necessarily is linear.

Continuous, channel-like boreholes open into said central duct and hydraulically connect it to radially external chambers surrounding it. One or more of the boreholes may open into each of these chambers. Aside the hydraulic connection by means of the channel-like boreholes and the central duct of the pulse damper, the chambers configured peripherally about the central duct are mutually kept both hydraulically and pneumatically leakproof.

Each of the chambers mounted around the central duct is divided by an elastic, pressure-resistant membrane into two sub-chambers which also are mutually separated in leak-proof manner, one of these sub-chambers being located radially inward and being connected through the channel-like boreholes to the fluid requiring damping, whereas the other sub-chamber is configured radially outward, as a result of which the membrane forms a partition common to the two sub-chambers. The outward sub-chamber is filled with a pneumatic fluid, preferably air or nitrogen. Moreover, when the pulse damper is being manufactured, the outward chamber can be pressurized and sealed hermetically, however it also may be designed as an open, active system in such a way that the available volume in the outward sub-chamber is subject to active pressure control.

Each of these two-part chambers in combination with one or more such channel-like boreholes operates as a Helmholtz resonator actively and effectively damping the liquid made to pass in the central pipe. The liquid present in the channel-like borehole and the hydraulic sub-chamber determines the mass of the vibrating Helmholtz system, whereas the associated spring combines its spring constant from the gas enclosed in the radially outward sub-chamber with the elasticity of the membrane wall. Accordingly the hydraulic Helmholtz resonator is loaded by a combined pressurized-gas/rubber spring.

Each Helmholtz resonator formed in such manner in the pulse damper can be adjusted to a given center frequency, more accurately to a defined frequency band, by matching the characteristics of the volume of air chamber, of the membrane as well as of the configuration and dimensioning of the channel-like borehole and its wall properties. The frequency band so tuned is acoustically erased out of the pressure pulse of the hydraulic liquid flow passing through the central pipe.

By axial, series connection of mutually differently tuned but range-wise mutually adjusted resonators in the pulse damper of the invention, it is possible to manufacture a damper which even when short and compact is able to damp a broad, finite frequency band. Such a frequency bandwidth then can cover the full audible range for instance in motor-vehicle power steering.

With a rotationally symmetric design, the "spring-chambers" of the resonators of the pulse damper preferably are annular chambers and the elastomer membrane is a pipe segment in particular running over the full axial length of the damper. In this membrane design, its prestressing can be adjusted in especially simple manner, and consequently the resonance characteristics of each individual Helmholtz resonator also can be controlled, tuned and set in simple manner.

Instead of using annular, continuous and closed resonator chambers surrounding the central duct, sequences of chambers of different sizes can be formed around the central pipe, each chamber illustratively being in the form of a segment of a cylinder ring. In this design and achieving maximum compactness, the pulse damper may be fitted with an especially wide damping frequency band.

The invention is elucidated below in relation to an illustrative embodiment and the drawing of a single FIGURE.

FIG. 1 shows a pulse damper with the features of the invention used in damping pressure pulses in the acoustic range to damp motor-vehicle power steerings.

Essentially the pulse damper shown in FIG. 1 consists of a central pipe 1, of an external pipe 8 in two shells (8.1, 8.2) and with an axial partition plane, said pipe 8 enclosing the central pipe 1, of an elastomeric sleeve 7 inserted between the central pipe 1 and the external pipe 8 by being clamped on the central pipe 1 and being stressed between the external pipe 8 and the central pipe 1, further of end caps 9 screwed or welded onto the end sides of the external pipe 8 or being affixed in another manner and which axially and radially keep the pulse damper dimensionally stable in a pressure-resistant and fluid-tight manner.

Appropriately the central pipe 1, the external pipe 8 and the end caps 9 are made of steel, aluminum or an appropriate plastic, through in principle they also may be made of any other suitable metallic or non-metallic, dimensionally stable, pressure-resistant and fluid-tight material. The tubular elastomeric membrane 7 in principle may consist of any pressure-resistant and fluid-tight, for the most part also temperature-resistant elastomer, for instance EPDM.

The inside of the pulse damper is sealed relative to the outside by sealing rings 11 which seal the end side of the outer tube 8 with respect to the radially inside surface of the end caps 9.

The interior space 4 of the central pipe 1 is inserted by means of connection rings 2, 3 into the omitted hydraulic conduit to be damped, namely as closely as possible to the outlet stub of the hydraulic pressure source, for instance a gear pump. Alternatively however the pulse damper shown in FIG. 1 also may be directly integrated in the pressure outlet of the pressure source.

The resonator chambers 6 are annular chambers closed per se configured coaxially around the interior space 4 of the central pipe 1 and are each divided by the elastomeric membrane 7 into a radially outward sub-chamber 6.1 and a radially inward sub-chamber 6.2.

Each radially outward chamber 6.1 is filled with a pneumatic fluid, preferably air or nitrogen. Preferably this gas is pressurized at a level exceeding the standard ambient pressure.

In the illustrative embodiment shown in FIG. 1, the outward sub-chambers 6.1 containing the pneumatic fluid are closed, whereby the filling gas is at constant operational pressure. Alternatively however these sub-chambers may be controlled as needed to be loaded with changing pressures by means of external pressure sources.

The radially inward sub-chambers 6.2 communicate hydraulically through channel-like boreholes 5 with the interior space 4 of the central pipe 1 and as a result both the boreholes 5 and the sub-chambers 6.2 as well as the interior space 4 of the central pipe 1 are filled with the fluid requiring damping.

Each chamber 6 is divided by the membrane 7 into the sub-chambers 6.1 and 6.2. The wall thickness of the membrane 7 is selected in such manner that the membrane 7 in each chamber 6 shall be absolutely pressure-resistant even at the maximum operating pressure that can be expected in the fluid requiring damping. Moreover the thickness of the membrane 7 relates to the spring constants required by the individual chambers.

The membrane tube 7 shown in FIG. 1 is fitted with annular flanges 10 projecting both radially inward and outward and entering matching annular grooves appropriately made both in the outer mantle surface of the central pipe 1 and in the inner mantle surface of the external pipe 8. Thereby the particular chambers 6 are sealed absolutely leakproof from each other both axially and radially.

FIG. 1 shows furthermore that the wall thicknesses both of the central pipe 1 and the external pipe 8 are selected in such manner that the radially inward sub-chamber 6.2 is formed directly in the outer mantle surface of the central pipe 1 and the radially outward sub-chamber 6.1 is formed directly in the inner mantle surface of the external pipe 8. This damper design is especially rugged and economical, though not mandatory. Both the connecting channels 5 and the chambers 6 may be separately manufactured components affixed to a central pipe 1. Such an embodiment may be much more appropriate for instance for empirical purposes than the compact design of the pulse damper shown in FIG. 1.

Again the configuration, distribution and sizes of the channel-like boreholes 5 are determined primarily by the tuning required by the particular application but only secondarily by construction requirements. Illustratively the channel-like boreholes or apertures 5 may be radially distributed in equidistant manner as well as in non-equidistant manner, as shown for instance in FIG. 1. Illustratively, given a known and defined angular position of damper installation, it may be wholly to the point to keep the base region of the interior space 4 of the central pipe 1 free of boreholes in order to prevent any sedimented solid particles carried along in the fluid requiring damping and that would settle from entering the chambers 6. Moreover the channel-like boreholes 5 also can be axially configured in such manner that—as seen in the axial direction—in each case only a series of channels, or two, three or more rings or other arrays of channels shall open into the adjoining sub-chambers 6.2. The distribution, configuration and sizes of the channel-like boreholes between the interior space 4 of the central pipe 1 and the hydraulic sub-chambers 6.2 are determined only by the damping characteristics, inclusive the degree of coupling, expected of each particular chamber 6.

What is claimed is:

1. A pulse damper for damping pressure pulses in pressurized liquids in conduits comprising
    a central pipe (1) adapted to contain a pressurized fluid and having fittings (2,3) for connecting the pulse damper to a pressurized-fluid conduit requiring damping,
    passages (5) extending perpendicular to a longitudinal axis of the central pipe and hydraulically connecting radially outward chambers (6) formed along the central pipe to an inside space (4) of the central pipe (1), and
    an elastic, pressure-resistant membrane (7) adapted to transmit pressure fluctuations and extending through each chamber (6) to separate the chamber in hermetic, fluid-tight manner into a first sub-chamber (6.1) filled with a pneumatic fluid and a second sub-chamber (6.2) adapted to be filled with said liquid through the passages (5).

2. Pulse damper as claimed in claim 1, wherein the passages (5) and the second sub-chambers (6.2) are formed in inner and outer surfaces respectively of the central pipe (1).

3. Pulse damper as claimed in claim 1, further comprising an external pipe (8) enclosing the central pipe (1) and being located radially outward from the membrane, an outer surface of the central pipe (1) and an inner surface of the external pipe (8) being geometrically complementary to each other and the pneumatic-fluid first sub-chambers (6.1) being formed in the inside surface of the external pipe (8).

4. Pulse damper as claimed in claim 3, wherein the external pipe (8) is comprised of two or more shells (8.1, 8.2).

5. Pulse damper as claimed in claim 2, wherein the elastic chamber membrane (7) is an elastomeric tube enclosing the outside surface of the central pipe (1) radially outward over its full axial length.

6. Pulse damper as claimed in claim 5, further comprising annular sealing ribs (10) formed integral with the elastomeric membrane tube (7) and projecting both radially outward and radially inward to implement mutually hermetic fluid sealing of said chambers (6) in the axial direction.

7. Pulse damper as claimed in claim 1, wherein an axial sequence of said chambers (6) has particular volumes that increase or decrease from chamber to chamber.

8. Pulse damper as claimed in claim 1, wherein the volumes of the first and second sub-chambers (6.1,6.2) forming a given chamber (6) are at least of the same order of magnitude.

9. In combination:

a pulse damper for damping pressure pulses in pressurized liquids in conduit comprising a central pipe (1) adapted to contain a pressurized fluid and having fittings (2,3) to a pressurized-fluid conduit requiring damping, passages (5) extending perpendicular to a longitudinal axis of the central pipe and hydraulically connecting radially outward chambers (6) formed along the central pipe to an inside space (4) of the central pipe (1), and an elastic, pressure-resistant membrane (7) adapted to transmit pressure fluctuations and extending through each chamber (6) to separate the chamber in hermetic, fluid-tight manner into a first sub-chamber (6.1) filled with a pneumatic fluid and a second sub-chamber (6.2) adapted to be filled with said liquid through the passages (5); and at least one automotive hydraulic servo line to which said central pipe is connected to receive pressurized fluid therefrom.

10. In combination:

a pulse damper for damping pressure pulses in pressurized liquids in conduit comprising a central pipe (1) adapted to contain a pressurized fluid and having fittings (2,3) to a pressurized-fluid conduit requiring damping, passages (5) extending perpendicular to a longitudinal axis of the central pipe and hydraulically connecting radially outward chambers (6) formed along the central pipe to an inside space (4) of the central pipe (1), and an elastic, pressure-resistant membrane (7) adapted to transmit pressure fluctuations and extending through each chamber (6) to separate the chamber in hermetic, fluid-tight manner into a first sub-chamber (6.1) filled with a pneumatic fluid and a second sub-chamber (6.2) adapted to be filled with said liquid through the passages (5); and an automotive power steering line to which the central pipe is connected to receive pressurized fluid.

* * * * *